US 9,873,523 B2

(12) United States Patent
Bothier

(10) Patent No.: US 9,873,523 B2
(45) Date of Patent: Jan. 23, 2018

(54) MONITORING OF AN AIRCRAFT PROPULSION SYSTEM

(71) Applicant: SNECMA, Paris (FR)

(72) Inventor: Guillaume Bothier, Fontainebleau (FR)

(73) Assignee: SNECMA, Paris (FR)

(*) Notice: Subject to any disclaimer, the term of this patent is extended or adjusted under 35 U.S.C. 154(b) by 56 days.

(21) Appl. No.: 14/874,678

(22) Filed: Oct. 5, 2015

(65) Prior Publication Data

US 2016/0096634 A1 Apr. 7, 2016

(30) Foreign Application Priority Data

Oct. 6, 2014 (FR) .................................. 14 59562

(51) Int. Cl.
| G06F 19/00 | (2011.01) |
| G06G 7/70 | (2006.01) |
| B64D 45/00 | (2006.01) |
| G05B 23/02 | (2006.01) |

(52) U.S. Cl.
CPC ......... *B64D 45/00* (2013.01); *G05B 23/0243* (2013.01); *B64D 2045/0085* (2013.01)

(58) Field of Classification Search
CPC ............ B64D 45/00; B64D 2045/0085; B64D 2045/0065; G05B 23/0243
USPC .......................................................... 701/99
See application file for complete search history.

(56) References Cited

U.S. PATENT DOCUMENTS

| 2011/0307220 A1* | 12/2011 | Lacaille ............... G05B 23/024 |
| | | 702/185 |
| 2012/0072091 A1* | 3/2012 | Muramatsu ............. G01K 7/42 |
| | | 701/100 |

FOREIGN PATENT DOCUMENTS

| EP | 1 630 633 A2 | 3/2006 |
| FR | 2 939 924 A1 | 6/2010 |

OTHER PUBLICATIONS

French Preliminary Search Report dated Jun. 4, 2015 in French Application 14 59562, filed on Oct. 6, 2014 (with English Translation of Categories of Documents).

* cited by examiner

Primary Examiner — Isaac Smith
(74) Attorney, Agent, or Firm — Oblon, McClelland, Maier & Neustadt, L.L.P.

(57) ABSTRACT

Monitoring the propulsion system of an aircraft includes selecting elements representative of operation of the propulsion system, modeling the propulsion system by a model including the selected elements, a set of exogenic parameters of the propulsion system and interdependence relations between the elements, operation of a given element being modelled by at least one endogenic parameter dependent on at least one of the exogenic parameters and/or on at least one parameter of another element, and analyzing elements, the analysis of the given element including the expression of the at least one endogenic parameter of the given element as a function only of exogenic parameters of the propulsion system and being made by layers of different levels, a layer of a given level being capable of taking account of at least one parameter that is the result of a layer of a different analysis level of another element.

7 Claims, 4 Drawing Sheets

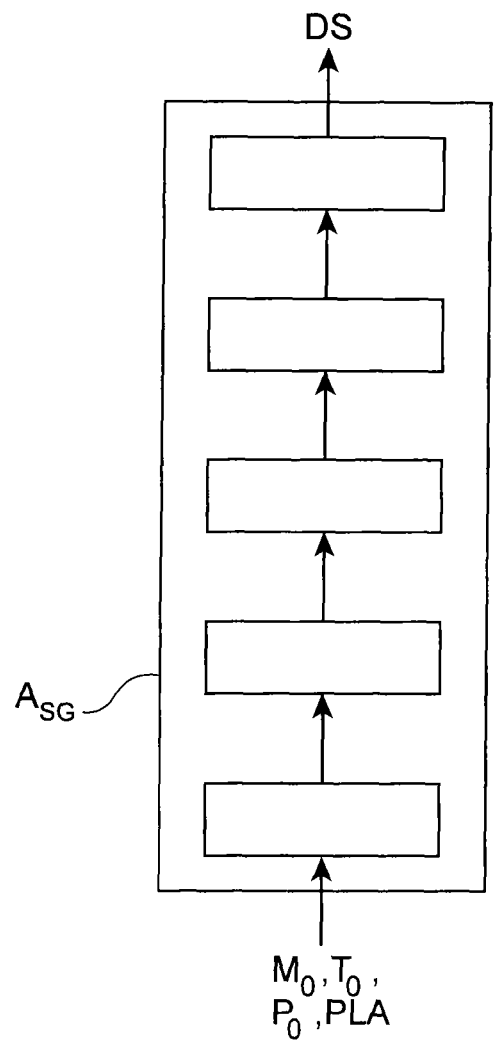
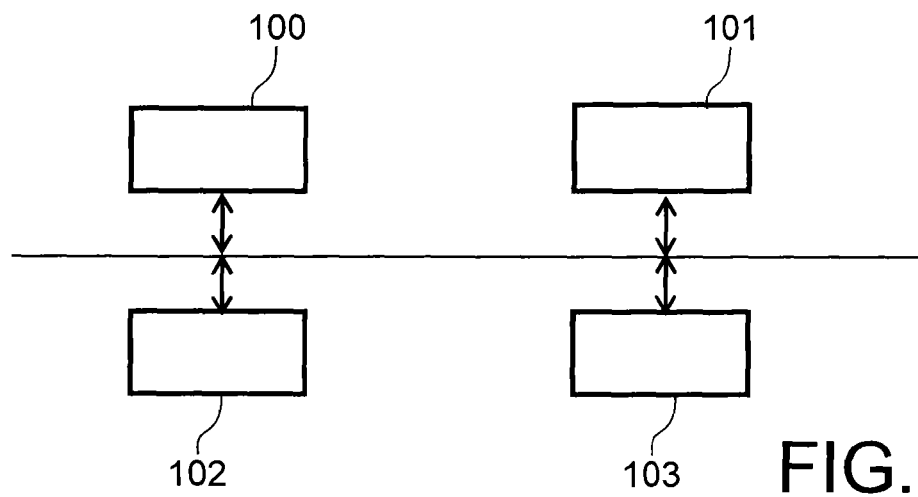
FIG. 5
FIG. 6

MONITORING OF AN AIRCRAFT PROPULSION SYSTEM

TECHNICAL DOMAIN

This invention relates to monitoring of an aircraft propulsion system, this propulsion system using electrical power for thrust generation.

STATE OF PRIOR ART

Aircraft propulsion unit structures are undergoing fundamental changes. In particular, electrical power will be used for thrust generation in aircraft of the future, either as the main power source or hybridised with a thermal propulsion system.

These changes have consequences on monitoring of propulsion units and particularly on monitoring of the health of these systems. On a conventional thermal turbine machine, power generation and thrust generation are positioned at approximately the same location. In the more advanced case of the turboprop, or more generally Geared Turbofans, a turbine machine drives a propeller or fan through a gearbox. The health of the thrust generator, in other words the propeller or fan and gas generator assembly, is determined by integrating indications about the health of the power transmission elements (power transmission shaft and gearbox).

Conventionally, the health or the state of health of each part is monitored separately. For example, the gearbox is monitored in vibration, the transmission shaft is monitored in torsion. Each element is analysed independently of the others, and the monitoring results for all elements may be merged. Monitoring results are returned to the pilot through aircraft systems and particularly through alerts requiring action by the pilot. These results are also sent to the onboard part of the maintenance system and/or to the ground. The diagnostic on monitoring results is made partly by the monitoring system and the pilot may add to it.

In new generation engine architectures, power transmission will be significantly more complex. These architectures may include particularly a power generator such as batteries or an auxiliary power unit called APU, power transmission cables, generators that transform electrical energy into mechanical energy, switching devices for power selection, etc. In one of the types of architecture to which the invention is applicable, all these elements contribute to generating propulsion energy from an electrical source.

Some elements will even have different inverted functional roles depending on the operation phases of the propulsion system. For example, electrical fans may become wind turbines during descent and generate power instead of consuming it.

In this context, it is unsatisfactory or even impossible to monitor the health of each element considered in isolation.

PRESENTATION OF THE INVENTION

The invention is aimed at solving the problems of prior art by disclosing a method for monitoring the propulsion system of an aircraft including the following steps:
Select elements representative of operation of the propulsion system;
Model the propulsion system by a model comprising the selected elements, a set of exogenic parameters of the propulsion system and interdependence relations between the elements, operation of a given element being modelled by at least one endogenic parameter dependent on at least one of the exogenic parameters and/or on at least one parameter of another element;
Analyse elements, the analysis of a given element including the expression of the at least one endogenic parameter of the given element as a function only of exogenic parameters of the propulsion system and being made by layers of different levels, a layer of a given level being capable of taking account of at least one parameter that is the result of a layer of a different analysis level of another element.

The invention is particularly advantageous for distributed propulsion systems or hybrid propulsion systems, because conventional monitoring is difficult to apply in this case. However, the invention is applicable to any electrical propulsion system.

The invention does not deal with each element separately, but considers them as a whole, taking account of interdependences between the elements of the propulsion system.

The invention does not consist of a set of analyses followed by merging of analysis results, but rather "hidden" merging of intermediate analysis results.

The invention simplifies maintenance actions. The invention can be used to target defective functions, while in the state of the art it is impossible to isolate interdependent components during a diagnostic of a failure of the turbine machine.

According to one preferred characteristic, the analysis of the given element comprises a data acquisition layer, a data normalisation layer and an abnormal event detection layer.

According to one preferred characteristic, the analysis of the given element also comprises a diagnostic on the element.

According to one preferred characteristic, the analysis of the given element also comprises a prognostic on the element.

According to one preferred characteristic, the analysis comprises an initialisation during which the propulsion system is considered as a whole, and that comprises an analysis of the propulsion system considered as a whole, as a function of exogenic parameters, so as to determine at least one endogenic parameter of each element of the propulsion system.

The invention also relates to a system for monitoring the propulsion system of an aircraft comprising:
Means of selecting elements representative of operation of the propulsion system;
Means of modelling the propulsion system by a model comprising the selected elements, a set of exogenic parameters of the propulsion system and interdependence relations between elements, operation of a given element being modelled by at least one endogenic parameter dependent on at least one of the exogenic parameters and/or at least one parameter of another element;
Means of analysing elements, the analysis of the given element including the expression of the at least one endogenic parameter of the given element as a function only of exogenic parameters of the propulsion system and being made by layers in different levels, a layer in a given level being able to take account of at least one parameter that is the result of a layer in another analysis level of another element.

The device has advantages similar to those mentioned above.

In one particular embodiment, the steps in the method according to the invention are implemented by the instructions of a computer program.

Consequently, the invention may be used in the form of a computer program on an information medium, this program being usable on a computer, this program including instructions adapted for implementation of the steps in a method like that described above.

This program can use any programming language and be in the form of a source code, an object code or intermediate code between source code and object code, such as in a partially compiled form, or in any required form whatsoever.

The invention also aims at an information medium that can be read by a computer, containing computer program instructions appropriate for implementation of the steps in a method like that described above.

The information medium may be any entity or device capable of storing the program. For example, the medium may comprise a storage means such as a ROM, for example a CD ROM or a micro-electronic circuit ROM, or possibly a magnetic recording means such as a diskette or a hard disk.

Secondly, the information medium may be a transmittable medium such as an electrical or optical signal that can be transferred through an electric or optical cable, by radio or by other means. The program according to the invention may in particular be downloaded from an Internet type network.

Alternately, the information medium may be an integrated circuit in which the program is included, the circuit being adapted to run or to be used for running the method according to the invention.

BRIEF DESCRIPTION OF THE DRAWINGS

Other characteristics and advantages will become clear after reading the following description of a preferred embodiment, given as a non-limitative example, described with reference to the figures in which:

FIG. 5 shows a preferred embodiment of an initialisation of the analysis shown in FIG. 4; and FIG. 6 shows a device for implementation of the monitoring method for the propulsion system of an aircraft according to one embodiment of this invention.

DETAILED PRESENTATION OF PARTICULAR EMBODIMENTS

Figure 1:
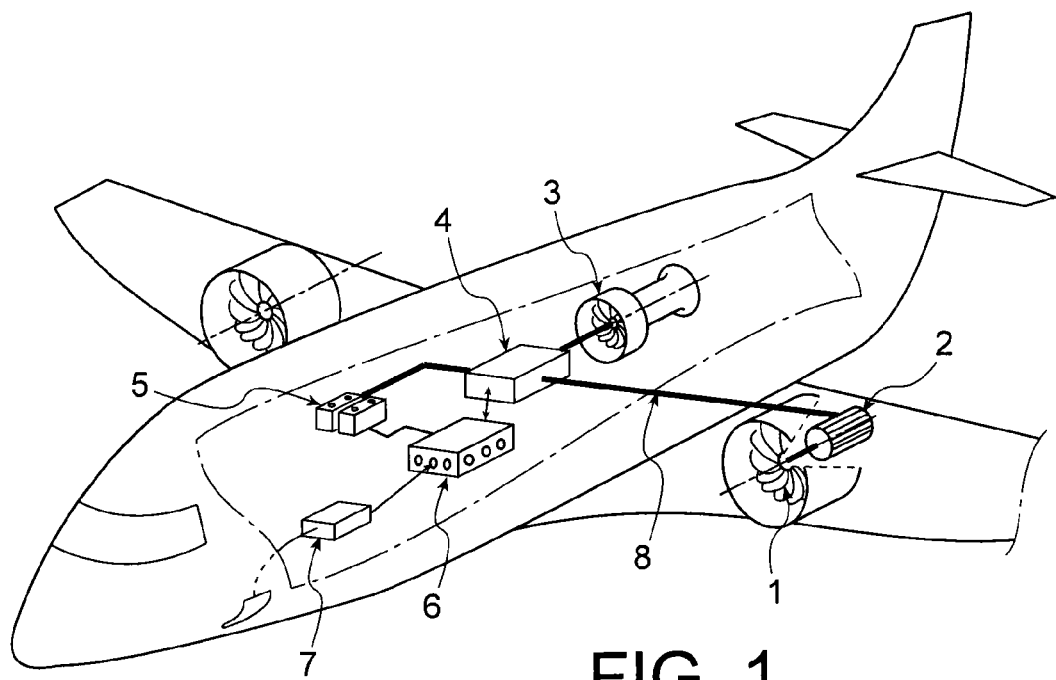
FIG. 1 diagrammatically shows a propulsion system of an aircraft.

According to one example embodiment shown in FIG. 1, the propulsion system of an aircraft comprises a number of elements, of which one sub-assembly is considered in the remaining description. In particular, all that will be described are characteristics of these elements in this assembly that will be useful for understanding the invention.

The propulsion system comprises firstly a fan 1. It also comprises an electric turbine 2 mechanically connected to the fan to rotate it and that is mechanically connected to the aircraft.

The propulsion system also comprises a power generator 3 that may or may not be thermal.

The propulsion system comprises a power distribution device 4 and one or more batteries 5. The function of the power distribution device 4 is to choose if the turbine 2 is to be powered through the batteries 5 or the power generator 3. Note that the power distribution function may be located in a specific device, as shown in FIG. 1. It may also be distributed in different elements.

Finally, the propulsion system comprises a mission computer 6, an aircraft parameter acquisition box 7 and an electrical power transmission 8 (cryogenic transmission). The mission computer 6 is electrically connected to the fan 1, the electric turbine 2, the power generator 3, the electrical power distribution device 4, the batteries 5, the aircraft parameter measurement acquisition box 7 and the cryogenic transmission 8.

The aircraft parameter acquisition box 7 acquires magnitudes such as the aircraft altitude and speed. These are aircraft environment context parameters or exogenic parameters.

The architecture of the propulsion system shown in FIG. 1 is given only as an example and the invention may be applied to other propulsion system architectures.

Figure 2:
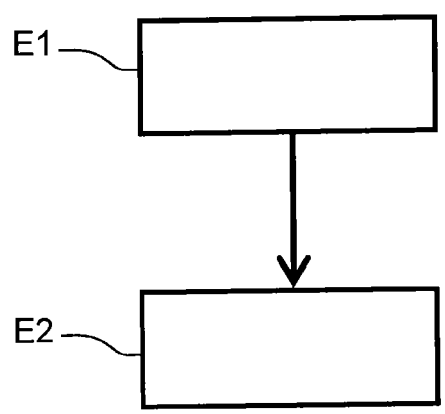
FIG. 2 shows the method for monitoring the propulsion system of an aircraft according to one embodiment of this invention.

FIG. 2 shows the method of monitoring the aircraft propulsion system, in the form of an algorithm comprising steps E1 to E2. The steps in the method are described later.

Figure 3:
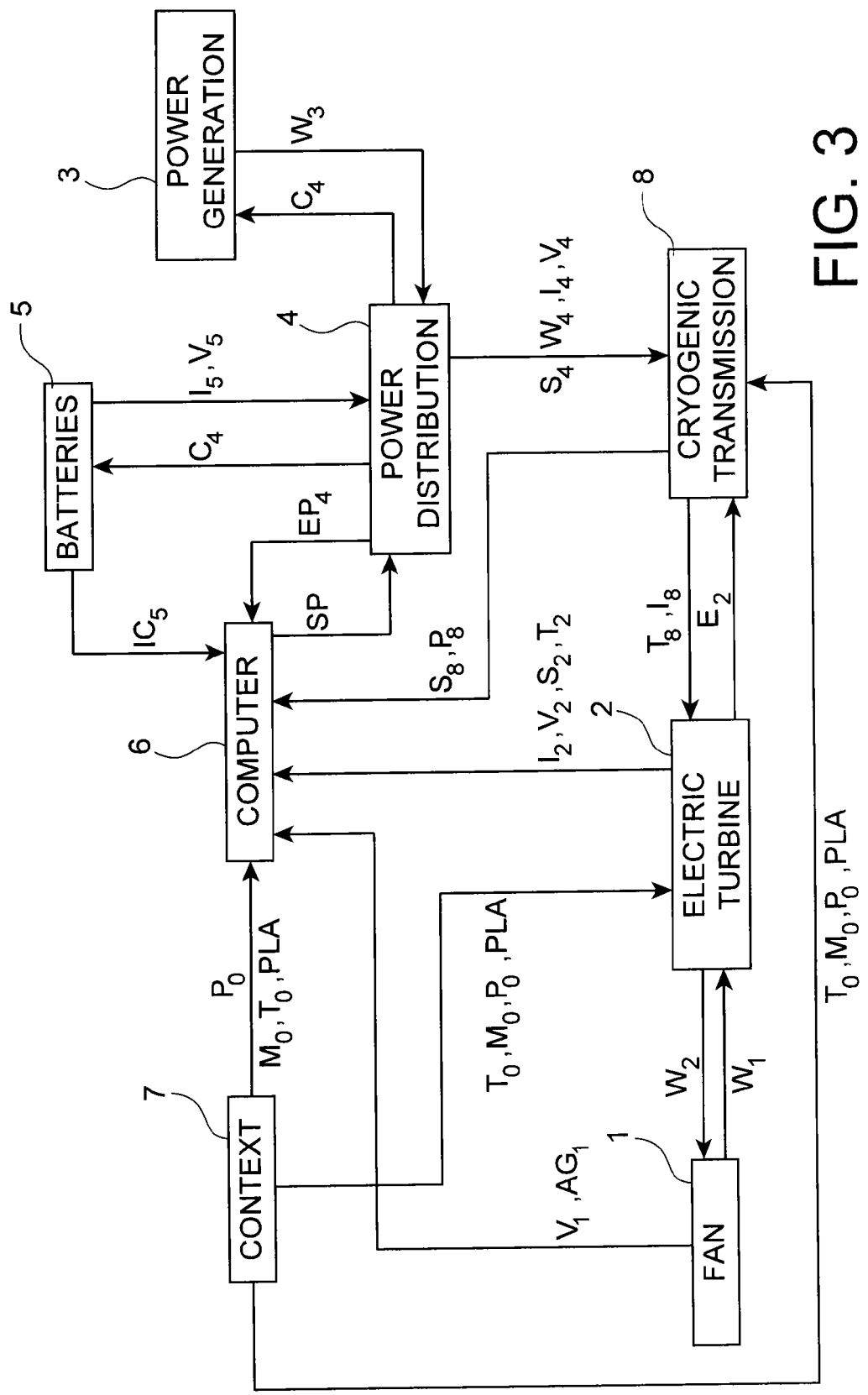
FIG. 3 shows an example of a model made during a modelling step of the method in FIG. 2.

FIG. 3 shows step E1 that is a model of the propulsion system, for example like that shown in FIG. 1. Therefore, the example considers the fan 1, the electric turbine 2, the power generator 3, the power distribution device 4, the battery (ies) 5, the context 7, and the cryogenic transmission 8.

The context 7 is an element that generates exogenic parameters of the propulsion system.

In general, the parameters considered herein are physical parameters related to operation of each element or characterising its physical operating environment.

The concept of an endogenic or exogenic parameter relates to a given element or a group of given elements. Unless mentioned otherwise, the concept of an endogenic or exogenic parameter in the remaining description relates to a given element. Exogenic parameters are external parameters of the element and endogenic parameters (dealing with health information) are internal parameters of this element.

For example, the following parameters are exogenic to the entire propulsion system and are considered within the scope of this invention:

$M_0$: upstream infinite Mach number (relative to the air flow entering the engine);
$P_0$: upstream infinite static pressure (ambient);
$T_0$: ambient air temperature;
ALTF: altitude in feet;
Aggression: impact for example on a blade;
GPS coordinates (different constraints described in the standards related to the geographic position);
PLA: throttle stick position.

An arrow from a first element to a second element means that at least one parameter of the first element must be taken into account in operation of the second element. Therefore an arrow represents an interaction between elements.

The model thus takes account of interdependence between the different elements. These interdependences have an influence on the analysis and on the diagnostic on the health of the element.

Thus in the example shown in FIG. 3, the computer 6 takes account of:

parameters of the fan 1 such as its rotation speed $V_1$, the existence of external aggression $AG_1$ (for example in the form of boolean information);

parameters of the electric turbine 2, such as a current $I_2$, a voltage $V_2$, a temperature $T_2$ and a health parameter $S_2$.

parameters of the cryogenic transmission 8, such as a health parameter $S_8$ and a prognostic $P_8$, parameters of the power distribution 4, such as a drawing off state $EP_4$ (for example in the form of an opening percentage of the distribution channel input valve);

parameters of the battery 5, such as a battery charging indicator $IC_5$, parameters of the context 7, such as $M_0$, $T_0$, $P_0$, PLA.

The fan 1 takes account of the mechanical power $W_2$ output by the electric turbine 2.

The electric turbine 2 takes account of the mechanical power $W_1$ output by the fan 1 when it operates in wind turbine mode.

The electric turbine 2 also takes account of the context parameters 7 such as $M_0$, $T_0$, $P_0$, PLA and parameters of the cryogenic transmission 8 such as a temperature $T_8$ and a current $I_8$.

The power generator 3 takes account of parameters of the power distribution 4, such as a set value $C_4$.

The power distribution 4 takes account of parameters of the power generator 3 such as the power $W_3$, of the battery 5, such as the current $I_5$ and the voltage $V_5$, and of the computer 6, such as the PLA set value, and an indication SP of the power source to be used.

The battery 5 takes account of parameters of the power distribution 4 such as the set value $C_4$.

The cryogenic transmission 8 takes account of parameters of the power distribution 4, such as the power $W_4$, the current $I_4$, the voltage $V_4$ and a health parameter $S_8$. It also takes account of parameters of the electric turbine 2, such as an emission or reception state $E_2$.

Obviously, more or fewer elements could be considered and more or fewer parameters could be considered in the model of the propulsion system.

Figure 4:
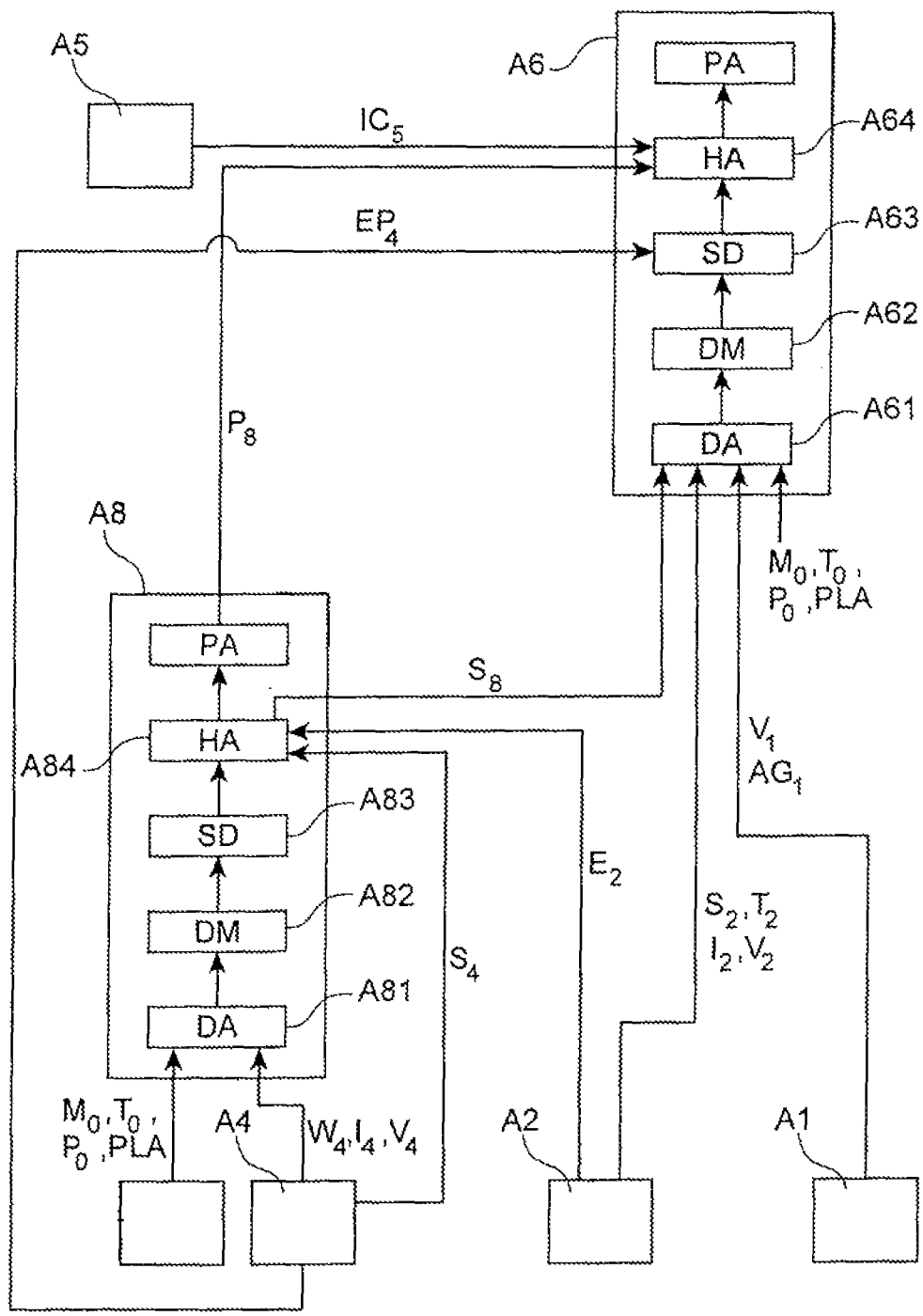
FIG. 4 shows an analysing step of the method in FIG. 3.

FIG. 4 shows the analysis step E2 that is made according to this invention. It is based on the model of the propulsion system, using the different elements forming it. Information from the different levels is merged. There is a lack of uniformity of layers between the layers in which parameters for a given component are generated and the layers in which these data are used when analysing another component, in the case of interdependence between components. For example, a data acquisition step for one component may take account of data preprocessed by a step in which an abnormal event is detected in another component.

To simplify the disclosure and FIG. 4, the figure shows an analysis of only two elements, namely the cryogenic transmission 8 and the computer 6. Obviously, all elements of the aircraft propulsion system that are considered are analysed in the same way by the method according to the invention.

An element is analysed by layers according to a scheme based on five successive layers corresponding to the OSA-CBM (Open Systems Architecture for Condition-Based Maintenance) standard:

DA (Data Acquisition): data acquisition;
DM (Data Manipulation): normalisation or learning of data;
SD (State Detection): detection of an abnormal event by exceeded threshold;
HA (Health Assessment): diagnostic,
PA (Prognostics Assessment): prognostic.

The DA layer is used to acquire all data used in the analysis of an element. Therefore, architecturally, this is the input point for data used for analysis. The analysis is represented and described from a functional point of view in the remaining description, in other words as if any layer might receive data.

The DM layer is used to explain data for the element concerned with the context. A learning exercise is carried out on how the element functions. The purpose of learning is to explain operation of an element as a function of the input data.

With a model determined by learning, input data are corrected as a function of the context data. Thus the DM layer outputs data that no longer depend on the context.

To achieve this, the principle is to eliminate the influence of the context. For a given endogenic parameter, a linear regression of the endogenic parameter is made as a function of exogenic parameters. A statistical regression of learning data for the relation between exogenic and endogenic parameters shows that the endogenic parameter can be expressed as a function of exogenic parameters. The function may be a polynomial, a combination of exponential functions or logarithmic functions, etc.

The regression found is tested on other learning data and a quality factor is assigned to it.

Different functions are tested and the function with the best quality factor, in other words that best explains the failure, is selected.

For example, the output temperature of a turbine is compared with the external environment temperature to be corrected if necessary, particularly if the temperature of the external environment is very high.

The SD layer determines whether or not an expected or abnormal event has occurred. An abnormal event is typically detected when an input data threshold is exceeded, and generates a binary value.

It can be determined whether or not a threshold is exceeded due to the analysed element considered, or to a previously analysed element for which the analysis results are input into the analysis of the element considered.

For this purpose, when the SD layer detects that a threshold has been exceeded, the value of the threshold exceeded information has to be verified for previously analysed elements to determine whether or not a threshold had been exceeded for these elements.

The SD layer determines a state. For example, the emission state or the reception state of the electric turbine 2 is determined by the SD layer of the analysis of this component.

The HA layer generates a diagnostic when an abnormal event is detected. The diagnostic is generated from a database that relates a problem to a consequence. For example, the diagnostic related to a threshold being exceeded is an electrical short circuit. This information can be used in maintenance.

It should be noted that a health indicator may be generated either at the output from an SD layer, or at the output from an HA layer. A health parameter is a combination of parameters. For example, the health of the battery 5 may be expressed as a function of the charge, the output current and the weight of the battery.

The PA layer generates a prognostic. A prognostic is preventive maintenance information for the aircraft. For example, this information may be a time remaining before the element considered is in failure.

It should be noted that these five layers are not necessarily used for all elements. For example, the analysis of a given element may comprise only the first three layers.

In FIG. 4, the analysis A8 of the cryogenic transmission 8 comprises the DA layer A81 that acquires the context data $M_0$, $T_0$, $P_0$ and PLA and data $W_4$, $I_4$ and $V_4$ originating from the analysis A4 of the power distribution 4.

The analysis A8 then comprises the DM layer A82 and the SD layer A83. The subsequent HA layer A84 receives data from the SD layer A83, and also data from the analysis A4 of the power distribution 4 and the analysis A2 of the electric turbine 2.

More precisely, a health indicator $S_4$ of the electric turbine 4 and a state (emission or reception) $E_2$ of the electric turbine 2 are used by the HA layer A84 to analyse the cryogenic transmission 8.

The analysis A6 of the computer 6 comprises the DA layer A61 that acquires context data $M_0$, $T_0$, $P_0$ and PLA and $V_1$ and $AG_1$ data from the analysis A1 of the fan 1, data $S_2$, $T_2$, $I_2$ and $V_2$ from the analysis A2 of the electric turbine 2 and health information data $S_8$ from the HA layer A84 from the analysis A8 of the cryogenic transmission 8.

The analysis A6 then comprises the DM layer A62 and the SD layer A63. Layer A63 receives data from the DM layer A62 and also data $EP_4$ data from the analysis A4 of the power distribution 4.

The next HA layer A64 receives data from the SD layer A63, and also data $IC_5$ from the analysis A5 of the battery 5 and data $P_8$ from the analysis A8 of the cryogenic transmission 8.

Thus, an analysis layer of a first element might process non-uniform level data, in other words parameters derived from layers of different levels in the analysis of a second element.

The result of the method according to the invention is information about the state of health of elements of the propulsion system, that can be sent to the pilot for example by displaying the state of health of each element on a graphic interface. Furthermore, data related to the state of health of the propulsion system are sent to the maintenance system.

A preliminary analysis phase of the propulsion system is an initialisation. According to a first preferred embodiment shown in FIG. 5, the propulsion system is considered firstly as a global system and the five analysis layers as previously presented are used for the analysis $A_{SG}$ of this global system. To achieve this, the context parameters $M_0$, $T_0$, $P_0$ and PLA are the input data for the analysis. The output data DS for the analysis $A_{SG}$ comprise at least one endogenic parameter for each element of the propulsion system.

Therefore, the result of the initialisation is a set of endogenic parameter values of elements of the propulsion system.

During the actual analysis of the propulsion system, values of endogenic parameters determined during initialisation are input into analysis blocks of the different elements of the propulsion system, as shown in FIG. 4. The initialisation values of the endogenic parameters are then replaced by values calculated during the analysis of the different elements in the propulsion system.

According to another embodiment, the preliminary analysis phase is replaced by the use of predetermined values for endogenic parameters. In other words, initialisation values of endogenic parameters are not determined by a preliminary analysis of the system considered globally, but are simply predetermined.

The method according to the invention is implemented using a dedicated integrated circuit or programmable processors, or a computer program stored in a computer memory.

Thus, FIG. 6 shows a particular embodiment of the device for monitoring the propulsion system of an aircraft according to the invention.

This device is the aircraft computer 6 and its general structure is like a computer. In particular, it comprises a processor 100 that runs a computer program using the method according to the invention, a memory 101, an input interface 102 and an output interface 103.

These various elements are conventionally connected by a bus.

The input interface 102 will receive data to be processed.

The processor 100 runs the processing described above. This processing is done in the form of code instructions of the computer program stored in the memory 101 before being run by the processor 100.

The memory 101 may also store the results of the processing done.

The output interface 103 outputs analysis results.

The invention claimed is:

1. A method for monitoring the propulsion system of an aircraft, comprising:
    selecting hardware elements contributing to operation of the propulsion system;
    modeling the propulsion system by a model comprising the selected hardware elements, a set of exogenic parameters of the propulsion system, and interdependence relations between the hardware elements, operation of a given hardware element being modelled by at least one endogenic parameter dependent on at least one of the exogenic parameters and/or on at least one parameter of another hardware element;
    analyzing hardware elements based on the modelling, the analysis of a given hardware element including an expression of the at least one endogenic parameter of the given element as a function of only exogenic parameters of the propulsion system and being performed using different layers, at least one layer for a given hardware element being capable of taking into account at least one endogenic or exogenic parameter that is a result from a layer of a different hardware element, when available; and
    outputting an alert to a pilot and/or a ground station based on the analyzing,
    wherein the function of only exogenic parameters of the propulsion system corresponding to the expression of the at least one endogenic parameter of the given hardware element is generated based on a statistical regression of learning data, and
    wherein the analyzing further includes obtaining data from the selected hardware elements contributing to operation of the propulsion system from an aircraft parameter acquisition system.

2. The monitoring method according to claim 1, wherein the analyzing further comprises analyzing hardware elements, the analysis of the given hardware element including the expression of the at least one endogenic parameter of the given hardware element as the function of only exogenic parameters of the propulsion system and being performed using different layers, the layers including a data acquisition layer, a data normalisation layer and an abnormal event detection layer.

3. The monitoring method according to claim 2, wherein the analysis of the given element also comprises a diagnostic on the element.

4. The monitoring method according to claim 3, wherein the analysis of the given element also comprises a prognostic on the element.

5. The monitoring method according to claim 1, wherein the analysis comprises an initialization during which the propulsion system is considered as a whole, the initialization including an analysis of the propulsion system considered as a whole, as a function of exogenic parameters, to determine at least one endogenic parameter of each element of the propulsion system.

6. A system for monitoring the propulsion system of an aircraft comprising:
    means for selecting hardware elements contributing to operation of the propulsion system;
    means for modelling the propulsion system by a model comprising the selected hardware elements, a set of exogenic parameters of the propulsion system, and interdependence relations between hardware elements, operation of a given hardware element being modelled by at least one endogenic parameter dependent on at least one of the exogenic parameters and/or at least one parameter of another element;
    means for analysing hardware elements based on the modelling, the analysis of the given hardware element including an expression of the at least one endogenic parameter of the given element as a function of only exogenic parameters of the propulsion system and being performed using different layers, at least one layer for a given hardware element being able to take into account at least one endogenic or exogenic parameter that is a result from a layer of a different hardware element, when available; and
    means for outputting an alert to a pilot and/or a ground station based on the analyzing,
    wherein the function of only exogenic parameters of the propulsion system corresponding to the expression of the at least one endogenic parameter of the given hardware element is generated based on a statistical regression of learning data, and
    wherein the means for analyzing further includes means for obtaining the selected elements representative of operation of the propulsion system from an aircraft parameter acquisition system.

7. A system for monitoring the propulsion system of an aircraft comprising:
    memory storing instructions; and
    processing circuitry configured, based on the stored instructions, to
    select hardware elements contributing to operation of the propulsion system,
    model the propulsion system by a model comprising the selected hardware elements, a set of exogenic parameters of the propulsion system, and interdependence relations between hardware elements, operation of a given hardware element being modelled by at least one endogenic parameter dependent on at least one of the exogenic parameters and/or at least one parameter of another element,
    analyze hardware elements based on the modelling, the analysis of the given hardware element including an expression of the at least one endogenic parameter of the given element as a function of only exogenic parameters of the propulsion system and being performed using different layers, at least one layer for a given hardware element being able to take into account at least one endogenic exogenic parameter that is a result from a layer of another element, when available, and
    output an alert to a pilot and/or a ground station based on the analyzing,
    wherein the function of only exogenic parameters of the propulsion system corresponding to the expression of the at least one endogenic parameter of the given hardware element is generated based on a statistical regression of learning data, and
    wherein the circuitry is further configured to analyze hardware elements based on the modelling by selecting elements representative of operation of the propulsion system from an aircraft parameter acquisition system.

* * * * *